United States Patent
Biggs et al.

(10) Patent No.: US 9,627,945 B2
(45) Date of Patent: Apr. 18, 2017

(54) SYSTEMS AND METHODS FOR PREVENTING ELECTRICAL ARCING BETWEEN COMPONENTS OF AN ESP MOTOR

(71) Applicant: Baker Hughes Incorporated, Houston, TX (US)

(72) Inventors: Stephen G. Biggs, Claremore, OK (US); Christopher G. Watson, Grove, OK (US)

(73) Assignee: Baker Hughes Incorporated, Houston, TX (US)

( * ) Notice: Subject to any disclaimer, the term of this patent is extended or adjusted under 35 U.S.C. 154(b) by 874 days.

(21) Appl. No.: 14/040,401

(22) Filed: Sep. 27, 2013

(65) Prior Publication Data
US 2015/0091399 A1 Apr. 2, 2015

(51) Int. Cl.
*H02K 11/00* (2016.01)
*H02K 5/128* (2006.01)
*H02K 11/40* (2016.01)

(52) U.S. Cl.
CPC ....... *H02K 11/0089* (2013.01); *H02K 5/1285* (2013.01); *H02K 11/40* (2016.01)

(58) Field of Classification Search
CPC ............................ H02K 11/40; H02K 11/0089
USPC ............................................... 310/88, 89, 71
See application file for complete search history.

(56) References Cited

U.S. PATENT DOCUMENTS

| | | | | |
|---|---|---|---|---|
| 5,454,724 A | * | 10/1995 | Kloeppel | F16C 19/52 310/90 |
| 6,541,886 B2 | * | 4/2003 | Mayumi | H02K 1/145 310/49.13 |
| 6,984,906 B1 | * | 1/2006 | Martiny, Jr. | H02K 11/40 310/67 R |
| 7,501,784 B2 | * | 3/2009 | Schrepfer | H02K 11/40 318/629 |
| 8,040,013 B2 | * | 10/2011 | Parmeter | E21B 43/128 310/216.129 |

* cited by examiner

*Primary Examiner* — Terrance Kenerly
(74) *Attorney, Agent, or Firm* — Law Offices of Mark L. Berrier

(57) ABSTRACT

Systems and methods for preventing electrical arcing in motors by placing an electrically conductive roller assembly between the stator and rotor of the motor. A rotor is mounted on a shaft, and this assembly is positioned within the bore of a stator. The roller assembly has a stationary portion that is secured to the stator. The roller assembly also has a movable portion on which a roller is mounted. The movable portion of the roller assembly is spring-loaded to urge the roller toward the shaft and thereby maintain contact between the roller and the shaft. When the shaft rotates within the bore, the roller rotates and rolls on the surface of the shaft, maintaining contact without rubbing against the shaft. An electrically conductive pathway is formed from the stator, through the roller assembly to the shaft and rotor thereby preventing an electrical potential from developing between the rotor and stator.

17 Claims, 2 Drawing Sheets

SYSTEMS AND METHODS FOR PREVENTING ELECTRICAL ARCING BETWEEN COMPONENTS OF AN ESP MOTOR

BACKGROUND

Field of the Invention

The invention relates generally to motors for electric submersible pump (ESP) systems, and more particularly to systems and methods that employ a conductive roller to provide an electrical pathway between the rotor and stator of an ESP motor and thereby prevent an electrical potential from developing between these components.

Related Art

Oil and natural gas are often produced by drilling wells into oil reservoirs and then pumping the oil and gas out of the reservoirs through the wells. If there is insufficient pressure in the well to force these fluids out of the well, it may be necessary to use an artificial lift system in order to extract the fluids from the reservoirs. A typical artificial lift system employs an electric submersible pump which is positioned in a producing zone of the well to pump the fluids out of the well.

An electric submersible pump system includes a pump and a motor which is coupled to the pump and drives the pump. The electric submersible pump system may also include seals, gauge packages and other components. Because they are designed to fit within the borehole of a well, electric submersible pump systems are typically less than ten inches wide, but may be tens of meters long. The motor of an electric submersible pump system may produce hundreds of horsepower.

The motor of the electric submersible pump system is typically an AC induction motor. The motor has a stator that is cylindrical with a coaxial bore. A rotor is coaxially positioned within the bore of the stator. The rotor is coupled to a shaft so that rotation of the rotor turns the shaft. Bearings hold the rotor in position within the bore of the stator and allow the rotor to rotate smoothly within the bore.

During the normal operation of an induction motor, a voltage may develop between the shaft, rotor and stator. The voltage difference between the rotor and stator may cause electrical arcs to occur between these components, as well as and other related components such as rotor bearings. Increased use of Pulse Width Modulation (PWM) type motor controllers has made this problem more common and acute.

The occurrence of electrical arcs between the rotor, stator and other components can cause damage to the components. The electrical arcs may, for example, cause the surfaces of the components to be pitted, and may cause small particles to break away from the surfaces. The oil flowing through the motor may carry these particles to other parts of the motor, causing increased wear on the components and shortening the life of the motor.

In some previous systems, the problem of arcing between the rotor and stator was addressed by attaching an electrically conductive brush to the stator housing. The brush made of a material such as beryllium-copper is positioned to contact the shaft of the motor. Typically, the brush is spring-loaded to maintain contact between the brush and the shaft. As the shaft and rotor rotate within the bore of the stator, the brush maintains contact with the shaft. In this manner, an electrical pathway is maintained between the rotor and stator.

While the brush maintains an electrical pathway between the rotor and stator and consequently prevents arcing between these components, this approach also has some problems. In particular, because the brush is constantly rubbing against the shaft, the friction between these components can cause small particles to be scraped off the contacting surfaces of the components. These particles are then carried by the oil throughout the motor, where they can damage the various components of the motor. Thus, the use of a brush against the shaft to maintain an electrical pathway between the rotor and stator results in one of the same problems that it was intended to alleviate.

It would therefore be desirable to provide means to prevent or reduce arcing between the stator and rotor without creating particles that may be suspended in the oil and may damage the components of motor.

SUMMARY OF THE INVENTION

This disclosure is directed to systems and methods for reducing electrical potentials between the rotor and stator of an ESP motor, as well as reducing the amount of particulates in the oil circulating within the motor. In one particular embodiment, an electric submersible pump (ESP) system includes a pump and a motor coupled to drive pump. The motor has a stator with a bore therethrough. A rotor is mounted on a shaft, and the rotor and shaft are positioned within the bore of the stator, so that they can rotate within the bore. The rotor is in electrical contact with the shaft. A conductive roller assembly is mounted on the stator. This assembly has a roller that is mounted on a support structure which allows the roller to freely rotate. The roller is electrically coupled to the support structure, so that when the roller is positioned against the shaft, an electrically conductive pathway is formed between the stator and the rotor. When the shaft rotates, the roller rolls against the outer surface of the shaft and maintains contact with the shaft without rubbing against the shaft. Because the roller rolls on the surface of the shaft instead of rubbing against it, the roller assembly maintains the electrically conductive pathway without scraping off particles that could contaminate the oil in the motor and damage the motor's components.

In one embodiment, the roller assembly is spring loaded. In this embodiment, the roller support structure has a stationary component that is secured to the stator, and a movable component on which the roller is mounted. A spring mechanism (e.g., a coil spring positioned between the stationary and movable components) urges the movable component toward a position in which the roller is in contact with the shaft. The spring mechanism may be selected to provide a desired amount of force (e.g., 3-4 pounds) with which the roller is held against the shaft.

An alternative embodiment comprises a method for reducing an electric potential between a stator and a rotor of an electric motor. The method includes providing an electric motor having a stator and a rotor, where the stator has a bore therethrough in which the rotor and shaft are positioned. The rotor and shaft are allowed to rotate within the bore. A conductive roller assembly is also provided. The roller assembly has a roller mounted on a support structure so that the roller can freely rotate. The roller assembly forms an electrically conductive pathway so that, when the assembly is secured to the stator and the roller is positioned against the shaft, the conductive pathway extends from the rotor to the stator. When the shaft rotates, the roller rolls against a surface of the shaft and maintains contact with the shaft, thereby maintaining the electrically conductive pathway without rubbing against the shaft and creating particles that could damage the motor's components.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
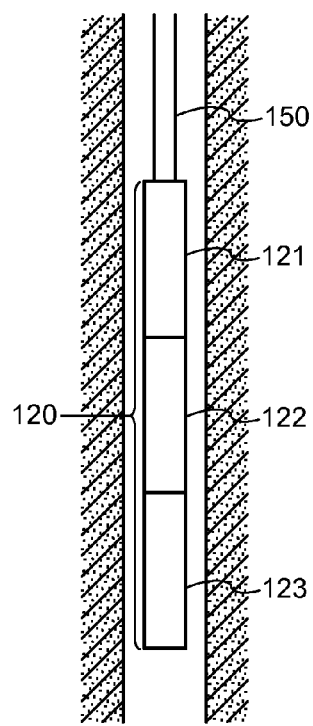
FIG. 1 is a diagram illustrating the components of an electric submersible pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention. Further, the drawings may not be to scale, and may exaggerate one or more components in order to facilitate an understanding of the various features described herein.

DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for preventing electrical arcing within motors such as ESP induction motors. Arcing between the stator and rotor is prevented by using an electrically conductive roller. The roller rotates on a frame that is attached to the stator housing. The frame positions the roller against the shaft of the motor. Because the rotor is secured to the shaft and is in electrical contact with the shaft, the roller and frame provide an electrical pathway between the rotor and stator. This electrical pathway allows current to flow between the rotor and stator thereby preventing an electrical potential from developing between the rotor and stator.

Embodiments of the invention may be implemented, for example, in electric submersible pump systems. Referring to FIG. 1, a diagram illustrating the components of an electric submersible pump system in one embodiment. In this embodiment, an electric submersible pump system is implemented in a well for producing oil, gas or other fluids. An electric submersible pump system 120 is coupled to the end of tubing string 150, and the electric submersible pump system and tubing string are lowered into the wellbore to position the pump in a producing portion of the well. A drive system (not shown) at the surface of the well provides power to the electric submersible pump system 120 to drive the system's motor.

Electric submersible pump system 120 includes a pump section 121, a seal section 122, and a motor section 123. Electric submersible pump system 120 may include various other components which will not be described in detail here because they are well known in the art and are not important to a discussion of the invention. Motor section 123 is coupled by a shaft through seal section 122 to pump section 121. Motor section 123 rotates the shaft, thereby driving pump section 121, which pumps the oil or other fluid through the tubing string 150 and out of the well.

Figure 2:
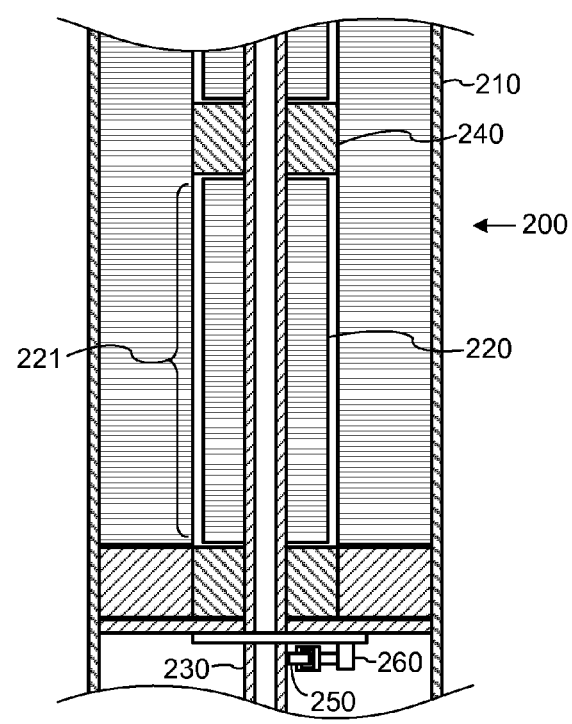
FIG. 2 is a diagram illustrating the structure of an exemplary motor suitable for use in an electric submersible pump system in accordance with one embodiment.

Referring to FIG. 2, a diagram illustrating the structure of an exemplary motor suitable for use in an electric submersible pump system is shown. As depicted in this figure, motor 200 has a stator 210 and a rotor 220. Stator 210 is generally cylindrical, with a coaxial bore that runs through it. Rotor 220 is coaxially positioned within the bore of stator 210. Rotor 220 is attached to a shaft 230 that is coaxial with the rotor and stator 210. In this example, rotor 220 includes multiple sections (e.g., 221), where bearings (e.g., 240) are positioned at the ends of each section. The bearings 240 support shaft 230, and consequently rotor 220, within the bore of stator 210 and allow the rotor and shaft 230 to rotate within the stator.

At the lower end of the motor, a roller 250 is positioned against shaft 230. A roller support structure 260 which is secured to the stator holds roller 250 in position against shaft 230. Roller 250 and roller support structure 260 are manufactured using electrically conductive materials and form an electrically conductive pathway from the stator to the shaft. Since rotor 220 is mounted on shaft 230, the electrically conductive pathway extends from the stator to the rotor.

Roller 250 rotates around an axis that is parallel to the axis of shaft 230, so that when the shaft rotates, roller 250 also rotates, thereby maintaining contact with the shaft without rubbing against the shaft. Since roller 250 rolls on the surface of shaft 230 instead of sliding on it or rubbing against it, the roller does not scrape particles from the surface of the shaft that would contaminate the oil in the motor. Likewise, shaft 230 does not scrape particles from the surface of roller 250.

Figure 3:
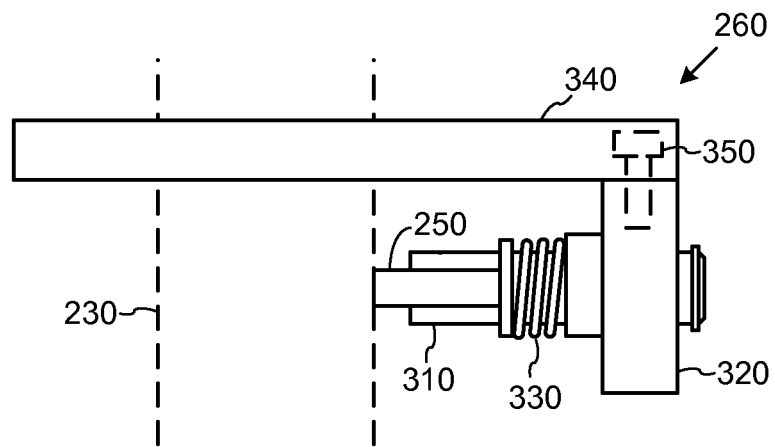
FIG. 3 is a diagram illustrating a side view of a roller assembly in accordance with one embodiment.
Figure 4:
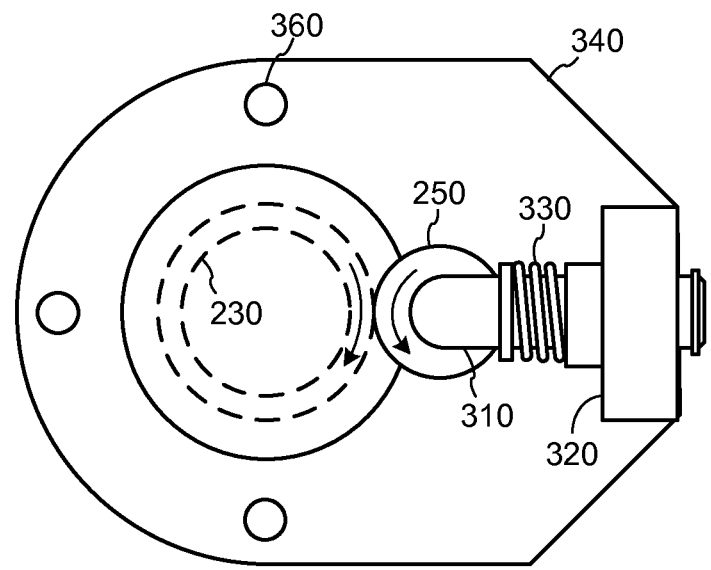
FIG. 4 is a diagram illustrating a bottom view of a roller assembly in accordance with one embodiment.

Referring to FIGS. 3 and 4, a pair of diagrams illustrating a roller assembly in accordance with one embodiment is shown. FIG. 3 is a view of the roller assembly from the side (with the axis of the motor parallel to the page), while FIG. 4 is a view of the roller assembly from the bottom (with the axis of the motor perpendicular to the page).

As noted above, roller 250 is positioned with its periphery (outer diameter) against the surface of shaft 230. Roller 250 is mounted on a spring-loaded arm 310. Suitable bearings are provided to allow roller 250 to rotate freely at the end of arm 310. Roller 250 therefore rolls on the outer surface of shaft 230—the contacting surfaces of roller 250 and shaft 230 preferably do not slide or rub against each other. Arm 310 is movably coupled to bracket 320 so that it moves laterally (left and right in the figure) with respect to the bracket. A spring 330 is mounted on arm 310 to urge the arm away from bracket 320 and toward shaft 230. Bracket 320 is rigidly mounted on mounting plate 340 by one or more screws 350. Plate 340 has a set of mounting holes (e.g., 360) therethrough which allow the plate (hence the entire roller assembly) to be mechanically secured and electrically coupled to the stator.

Referring to FIG. 4, the relative rotation of shaft 230 and roller 250 is shown. As depicted in this figure, shaft 230 is rotating in a clockwise direction, which causes roller 250 to rotate in a counterclockwise direction. Spring 330 is selected so that the pressure with which roller 250 is urged against shaft 230 is sufficient to maintain contact between them, but is not enough to create a significant mechanical load on the shaft. The spring may, for example, provide a suitable, predetermined range of force (e.g., 3-4 pounds).

Alternative embodiments may include, for example, methods for manufacturing induction motors for ESP systems in which an electrically conductive path is formed between the stator and rotor to prevent arcing between them. In one exemplary method, a stator is manufactured using conventional methods. A rotor is also constructed using conventional methods. The rotor is mounted on a shaft, and the rotor and shaft are positioned in the bore of the stator. An electrically conductive roller assembly is secured to the lower end of the stator. A roller of the assembly is positioned against the shaft, and is urged toward the shaft by a spring mechanism, thereby forming a conductive path from the stator to the rotor. When the shaft rotates, it causes the roller to rotate, so contact is maintained between the roller and the shaft without causing any sliding or rubbing of the roller surface with respect to the shaft surface.

It should be noted that there may be many alternative embodiments. For example, the roller may have any suitable dimensions, and may be made of any suitable material. The roller may be constructed entirely of conductive materials, or it may incorporate nonconductive materials as well. The roller support structure may likewise be constructed in any suitable configuration, and may use any materials that are suitable to form a conductive path between the stator and rotor. The spring mechanism may employ coil springs or any other type of spring, and may have any spring constant that is appropriate to provide the desired amount of force to hold the roller against the shaft. The rotor and stator may have any suitable configurations. Alternative embodiments may have many other features as well that vary from those specifically described above.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed herein.

What is claimed is:

1. An electric submersible pump (ESP) system comprising:
    a pump; and
    a motor coupled to the pump, wherein the motor drives the pump;
    wherein the motor includes
        a stator having a bore therethrough,
        a rotor mounted on a shaft and electrically coupled to the shaft, wherein the rotor and shaft are rotatably positioned within the bore of the stator, and
        a conductive roller assembly having a roller rotatably mounted on a roller support structure,
            wherein the roller is electrically coupled to the roller support structure,
            wherein the roller support structure is secured to the stator and electrically coupled to the stator,
            wherein the roller is positioned against a surface of the shaft at an outer diameter of the shaft and is thereby electrically coupled to the shaft, and
            wherein when the shaft rotates, the roller rolls against the surface of the shaft and maintains contact with the surface, thereby maintaining an electrically conductive pathway between the stator and the rotor.

2. The ESP system of claim 1, wherein the roller assembly is spring loaded, thereby urging the roller toward the shaft.

3. The ESP system of claim 2, wherein the roller support structure comprises:
    a stationary component that is secured to the stator,
    a movable component that is coupled to the stationary component, and
    a spring,
    wherein the spring is coupled to the stationary component and the movable component and urges the movable component toward a position in which the roller is in contact with the shaft.

4. The ESP system of claim 1, wherein when the shaft rotates, the roller rolls against the surface of the shaft without sliding.

5. The ESP system of claim 1, wherein the motor comprises an induction motor.

6. An electric motor comprising:
    a stator having a bore therethrough;
    a rotor, wherein the rotor is mounted on a shaft and electrically coupled to the shaft, and
        wherein the rotor and shaft are rotatably positioned within the bore of the stator; and
    a conductive roller assembly having a roller rotatably mounted on a roller support structure,
        wherein the roller is electrically coupled to the roller support structure,
        wherein the roller support structure is secured to the stator and electrically coupled to the stator,
        wherein the roller is positioned against a surface of the shaft at an outer diameter of the shaft and is thereby electrically coupled to the shaft, and
        wherein when the shaft rotates, the roller rolls against the surface of the shaft and maintains contact with the surface, thereby maintaining an electrically conductive pathway between the stator and the rotor.

7. The motor of claim 6, wherein the roller assembly is spring loaded, thereby urging the roller toward the shaft.

8. The motor of claim 7, wherein the roller support structure comprises:
    a stationary component that is secured to the stator;
    a movable component that is coupled to the stationary component; and
    a spring;
    wherein the spring is coupled to the stationary component and the movable component and urges the movable component toward a position in which the roller is in contact with the shaft.

9. The motor of claim 6, wherein when the shaft rotates, the roller rolls against the surface of the shaft without sliding.

10. The motor of claim 6, wherein the motor comprises an induction motor.

11. The motor of claim 6, wherein the motor is configured to be positioned downhole in an electric submersible pump (ESP) system.

12. A method for reducing an electric potential between a stator and a rotor of an electric motor, the method comprising:
   providing an electric motor having a stator and a rotor, wherein the stator has a bore therethrough, wherein the rotor is mechanically and electrically coupled to a shaft, and
      wherein the rotor and shaft are rotatably positioned within the bore of the stator;
   providing a conductive roller assembly having a roller rotatably mounted on a roller support structure; and
   maintaining an electrically conductive pathway between the stator and the rotor by securing the roller support structure to the stator, and
      positioning the roller against a surface of the shaft at an outer diameter of the shaft, wherein when the shaft rotates, the roller rolls against the surface of the shaft and maintains contact with the shaft.

13. The method of claim 12, further comprising urging the roller toward the shaft with a force that is within a predetermined range.

14. The method of claim 13, further comprising providing a movable component in the roller support structure, wherein the movable component is spring-loaded, and wherein the movable component urges the roller toward the shaft.

15. The method of claim 12, further comprising ensuring that when the shaft rotates, the roller rolls against the surface of the shaft without sliding.

16. The method of claim 12, further comprising installing the motor in an electric submersible pump (ESP) system.

17. The method of claim 16, positioning the ESP system downhole in a well.

\* \* \* \* \*